G. C. TUCKER.
INSECT DESTROYER.
APPLICATION FILED MAR. 28, 1917.
1,236,629.
Patented Aug. 14, 1917.
3 SHEETS—SHEET 3.
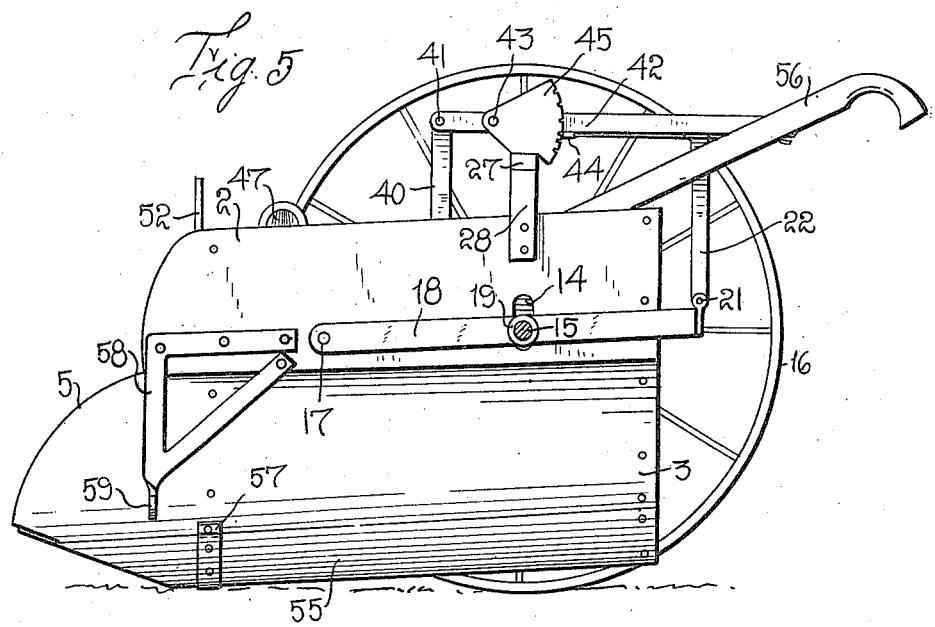
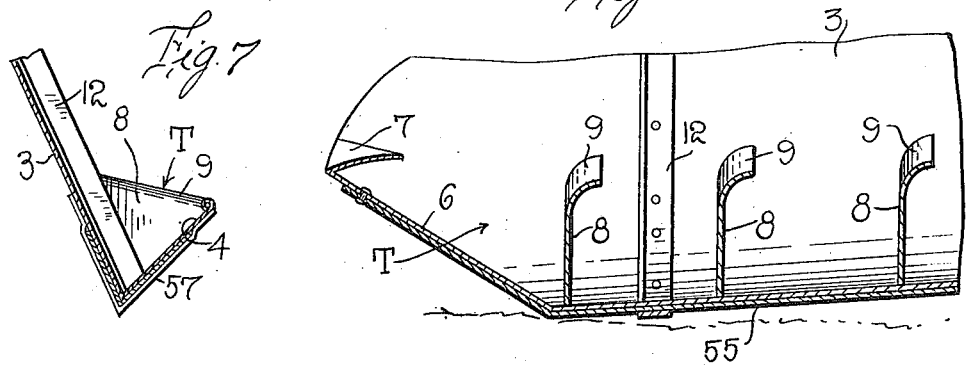
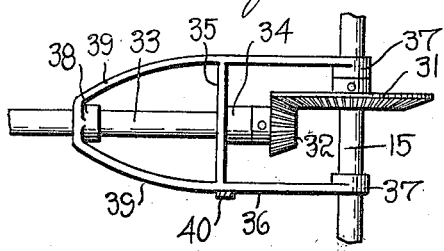
Inventor
GROVER C. TUCKER
By Watson E. Coleman
Attorney

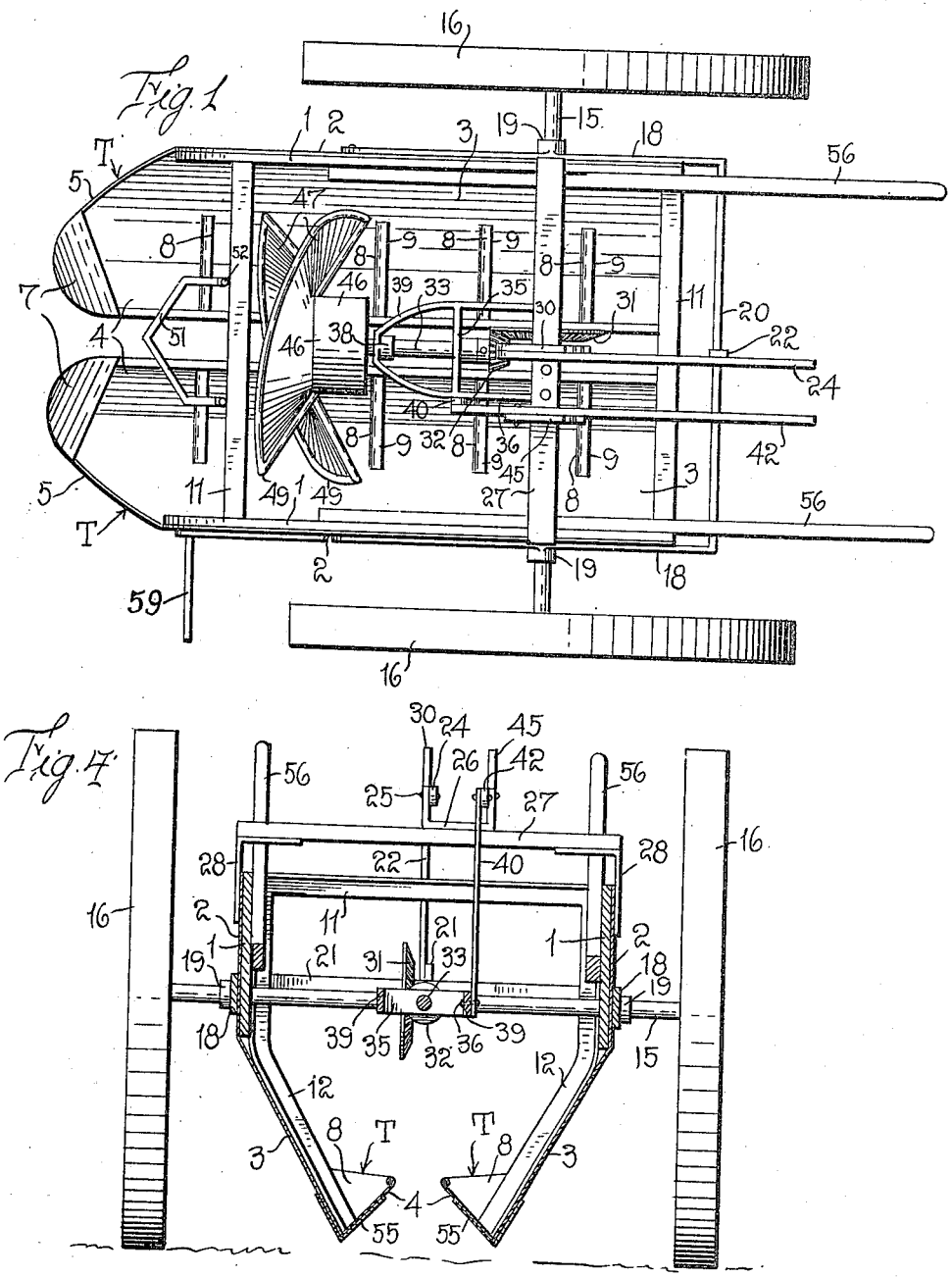

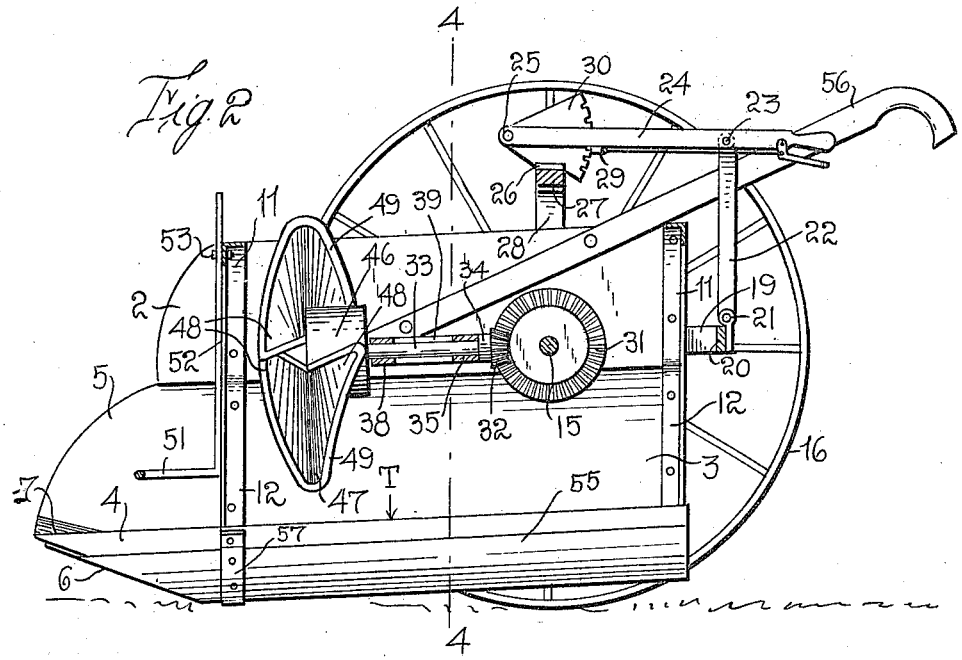

UNITED STATES PATENT OFFICE.

GROVER C. TUCKER, OF TUSCALOOSA, ALABAMA, ASSIGNOR TO TUCKER IMPLEMENT CO., OF GREENSBORO, ALABAMA, A CORPORATION OF ALABAMA.

INSECT-DESTROYER.

1,236,629. Specification of Letters Patent. Patented Aug. 14, 1917.

Application filed March 28, 1917. Serial No. 158,021.

*To all whom it may concern:*

Be it known that I, GROVER C. TUCKER, a citizen of the United States, residing at Tuscaloosa, in the county of Tuscaloosa and State of Alabama, have invented certain new and useful Improvements in Insect-Destroyers, of which the following is a specification, reference being had to the accompanying drawings.

This invention relates to certain improvements in insect destroyers and has relation more particularly to a device of this general character especially designed and adapted for use in connection with boll weevils, and is an improvement on the device as disclosed in my prior Patent No. 1,189,508, dated July 4, 1916.

It is an object of the invention to provide a device of this general character having novel and improved means whereby the foliage of the plants may be readily and effectively agitated and whereby the insects and punctured squares released from the plants are collected.

It is also an object of the invention to provide a novel and improved device of this general character including a portable frame provided with agitating means and whereby said frame substantially incases the plants as the same travels along a row so that the insects or the like relieved from the plant are substantially entirely collected.

A still further object of the invention is to provide a device of this general character including a portable body provided with collecting troughs and with agitating means together with a novel and improved arrangement of parts whereby the body may be adjusted vertically and whereby the agitating means may also be adjusted but independently of the vertical adjustment of the body.

Furthermore the invention has for an object to provide a novel and improved device of this general character wherein a rotary beater is employed and wherein the supporting shaft for said beater is rotatably mounted within a yoke, said yoke being of such construction and formation as to effect a separation or expansion of the foliage after the same has been engaged by the beater in order to afford further means for agitating the foliage.

The invention also has for an object to provide a novel and improved device of this general character including a main agitating means together with a supplemental member positioned in advance of the main agitating means for effecting an agitation or separation of the foliage of the plants before the same are engaged by the main agitating means.

The invention consists in the details of construction and in the combination and arrangement of the several parts of my improved insect destroyer whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in top plan illustrating an insect destroyer constructed in accordance with an embodiment of my invention;

Fig. 2 is a fragmentary sectional view taken through the device as herein disclosed with the rotary beater in elevation;

Fig. 3 is a view in front elevation of the device as herein set forth;

Fig. 4 is a sectional view taken substantially on the line 4—4 of Fig. 2;

Fig. 5 is a view in side elevation of the device as herein disclosed one of the supporting wheels being removed;

Fig. 6 is a fragmentary longitudinal sectional view taken through one of the troughs as herein included;

Fig. 7 is a transverse sectional view taken through the structure as disclosed in Fig. 6; and Fig. 8 is a fragmentary view in top plan illustrating the supporting yoke coacting with the beater shaft as herein embodied.

As herein embodied, I employ the substantially parallel side boards 1. Suitably secured to the outer faces of the boards 1 are the metallic plates 2 extending below the longitudinal marginal portions of said boards 1, said extended portions being disposed inwardly on predetermined inclines, as indicated at 3, and having their lower edges provided with the upstanding flanges 4 affording the spaced troughs T.

The forward extremities of the inclined portions 3 extend in advance of the side boards 1, as indicated at 5, with the free edges thereof disposed on a predetermined curvature. The bottoms of the troughs T at the forward ends thereof are disposed on upward inclines, as indicated at 6, while the top portions of said troughs T at the forward ends are provided with the plates 7 overlying the same and which serve to prevent spilling of the solution within the troughs and also as a guard to prevent the foliage of the plants from entering within the troughs and forcing the solution therefrom. The plates 7 also afford a means for more easily introducing the device beneath the foliage of the plants and also afford a protection against the introduction of dirt into the troughs T in case the nose of the device is run in contact with the ground.

The troughs T are also provided with a predetermined number of longitudinally spaced partitions 8 which serve to maintain the solution within the troughs in a state of quiescence. The upper free margins of the partitions 8 are disposed rearwardly on a predetermined incline, as indicated at 9, to provide further means for preventing the foliage from engaging the solution within the troughs and be forced or wiped therefrom. The inclined portions 9 also afford a means for the easier passage of the plant, especially when heavily fruited, over said partitions 8 without injury thereto.

The troughs T are substantially V-shape in cross section and have their rear ends closed by the plate 10.

The inclination of the portions 3 of the plates 2 is such as to maintain the troughs T in predetermined spaced relation so that the same may be disposed upon opposite sides of a row of plants but extend beneath the foliage thereof and in close proximity to the stalks.

The side boards 1 are maintained in predetermined spaced relation through the medium of the arched braces 11 positioned adjacent the opposite ends thereof and the side members of said arched braces 11 overlie, as indicated at 12, the inner faces of the portions 3 of the plates 2 and are suitably connected thereto whereby it will be perceived that a substantially rigid structure is produced. The braces 11 also afford a further means of agitating the outer edges of the foliage. This is of particular advantage relative to the forward brace, as the outer edges of the foliage is agitated before the same is acted upon by the beater to be hereinafter more particularly referred to.

It is also to be noted that the cross sectional configuration of the troughs T permit the device to be run through the ground and thus enables the troughs to get under very low branches of the plants without injury to the lower branches thereof. In other words the bottoms of the troughs T present cutting edges which can readily penetrate the earth and thus position the receiving end of the troughs under the lower branches. It will also be noted that with the troughs T substantially V-shape in cross section, the space therebetween is substantially in the form of an inverted V which permits the machine traveling over rough clods of earth or stones which would otherwise impede its progress or unduly elevate the same.

The boards 1 and the coacting portions of the plates 2 at a predetermined point inwardly of the rear ends of the boards are provided with the vertically disposed slots 14 in transverse alinement and through which is directed the shaft 15. The shaft 15 bridges the space between the boards 1 and extends beyond the outer sides thereof and to said extended portions are suitably affixed the supporting wheels 16 whereby the shaft 15 will be caused to rotate with the wheels 16 as the machine advances.

Pivotally connected, as at 17, with each of the side boards 1 at a predetermined point in advance of the slot 14 is an arm 18 which is pivotally mounted intermediate its length, as at 19, upon the shaft 15. The arm 18 extends beyond the rear end of the side board. The rear end portions of the arms 18 are connected by the cross member 20 and pivotally engaged, as at 21, with said cross member 20 is a rigid link 22 which is also pivotally engaged, as at 23, with the substantially horizontally disposed lever 24. The forward end of the lever 24 is pivotally engaged, as at 25, with an upstanding member of the substantially U-shape bracket 26 carried by the transverse beam 27 supported by the side boards 1 at a predetermined distance thereabove through the medium of the irons or brackets 28.

The lever 24 is provided with a conventional latch 29 coacting with the rack 30 integrally formed with one of the upstanding members of the bracket 26. It will be at once self-evident that upon imparting the requisite rocking movement to the lever 24 the arms 18 may be so swung or rocked as to raise or lower the body of my improved machine as afforded by the side boards 1, the plates 2 and the concomitant parts thereof.

Intermediate the side boards 1 the shaft 15 has affixed thereto the bevel gear 31 which is in mesh with the bevel gear 32 carried by the inner end of the shaft 33. The shaft 33 is disposed longitudinally of the machine and occupies a vertical plane intermediate the troughs. The inner end portion of the shaft 33 is rotatably supported by the bearing 34 carried by the cross or transverse member 35 of the yoke 36. The yoke 36 comprises side members having their free end portions loosely mounted, as at 37, upon the shaft 15, while the opposite or forward end portions of the side members of the yoke are disposed one toward the other on predetermined inclines with their ends connected by a second bearing 38 through which the shaft 33 is disposed. The inclined portions 39 at the forward end of the yoke serve to permit the yoke 36 to pass through the foliage of the plants in order to impart a separating movement or expansion to the foliage to afford an agitating means therefor.

Operatively engaged with the yoke 36 is a rigid link 40 pivotally engaged, as at 41, with the lever 42 pivotally engaged intermediate its length, as at 43, with a second upstanding member of the bracket 26 whereby it will be perceived that upon requisite rocking movement being imparted to the lever 42, the outer or free end portion of the shaft 33 may be vertically adjusted in accordance with the requirements of practice. The lever 42 is also provided with a conventional latch mechanism 44 coacting with the rack 45 herein disclosed as forming part of the upstanding member of the bracket 26 with which the lever 42 is pivotally engaged. By this arrangement it will be perceived that the outer or free end portion of the shaft 43 may be effectively maintained in its different vertical adjustments.

The outer or free end portion of the shaft 33 has affixed thereto a beater comprising a hub 46 from which substantially radiate the substantially semi-circular and diametrically opposed blades 47, the hand or pitch of which is such as to afford substantially a spiral action and between which the foliage of the plant is adapted to pass whereby it will be perceived that such foliage is thoroughly agitated which assures the disengagement of the insects or punctured squares from the plants. It is also to be noted that the adjacent ends of the blades 47 at their peripheral portions, as indicated at 48, are in overlying relation, whereby the action upon the foliage is materially increased.

It is to be observed that the beater is positioned rearwardly of the forward ends of the troughs T and rearwardly of the forward arched brace 11, and it is also to be observed that the hand or pitch of the blades 47 is such as to direct air blasts upon the foliage which assures the release of the insects or the like and which also in practice has been found to prevent undue injury to the plant by the beater. It is also to be understood that the beater constitutes the main agitating means or member of my improved device.

It is also particularly desirable to have the free marginal portions of the blades of the beater beaded, as indicated at 49, so that possibility of injury to the plant is further reduced. I also find it of advantage to tie or connect the adjacent ends of the blades 47 by the metallic strap 50 overlying the outer faces of said blades as particularly illustrated in Fig. 3 of the accompanying drawings.

It has also been found of especial importance to provide means whereby the plants may be so inclined to bring the foliage thereof over the troughs T and that such action be effected before the foliage is engaged by the beater or main agitating means. As herein disclosed, I accomplish this purpose through the medium of the substantially horizontally disposed V-shaped member 51 having its apex forwardly directed and having its rear ends provided with the upstanding elongated members 52 operatively engaged with the intermediate portion of the forward arched brace 11 through the medium of a clamping bolt 53 or the like. It is to be noted that the members 52 are provided with a plurality of longitudinally spaced openings 54 so that the member 51 may be vertically adjusted in accordance with the requirements of practice.

Suitably secured to the bottoms of the troughs T are the shoes 55 conforming to the configuration of said troughs. The forward end portions of the shoes are adapted to engage upon the ground and thereby tend to guide the device in its travel, yet permitting a ready and convenient lateral adjustment so that a plant offset from a row may be readily caused to pass between the troughs T. The lateral adjustment of the device may be readily effected through the medium of the handles 56 extending rearwardly from the side boards 1. The handles 56 also permit the body of the device to be rocked relative to the shaft 15 when the necessities of practice may require during the travel of the machine.

I also find it of advantage to provide the forward portion of each of the shoes with the transversely disposed reinforcing strap 57 having its extremities secured to the adjacent trough T. This strap 57 serves to maintain the shoe in proper engagement with the trough especially in the event that the fastening means for the shoe should become loosened.

Secured to the forward end portion of one of the side boards 1 is a vertically disposed bracket 58 preferably triangular in form and having its lower portion provided with the transversely directed member 59 to the extremities of which is suitably secured the end portions of the flexible member 60 and which is adapted to serve as a hitching means.

From the foregoing description, it is thought to be obvious that an insect destroyer constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A device of the character described including a shaft, a body provided with a vertically disposed slot through which the shaft is directed and provided with a trough adapted to underlie the foliage of a plant, a rock arm engaged with the shaft and pivotally engaged with the body, a lever pivotally engaged with the body, and a rigid link operatively engaged with the lever and the rock arm.

2. A device of the character described including a shaft, a body provided with a vertically disposed slot through which the shaft is directed and provided with a trough adapted to underlie the foliage of a plant, a rock arm engaged with the shaft and pivotally engaged with the body, a lever pivotally engaged with the body, a rigid link operatively engaged with the lever and the rock arm, and coacting locking means carried by the body and the lever whereby the body may be locked in its different vertical adjustments.

3. A device of the character described including a portable body provided with a trough adapted to underlie the foliage of a plant, plant-bending means carried by the body, agitating means carried by the body rearwardly of the bending means, and means carried by the body rearwardly of the agitating means for expanding the foliage of a plant.

4. A device of the character described including a portable body provided with a trough adapted to underlie the foliage of a plant, plant-bending means carried by the body, agitating means carried by the body rearwardly of the bending means, and means carried by the body rearwardly of the agitating means for expanding the foliage of a plant, said last named means serving as a support for the agitating means.

5. A device of the character described including a portable body provided with a trough adapted to underlie the foliage of a plant, plant-bending means carried by the body, agitating means carried by the body rearwardly of the bending means, and means carried by the body rearwardly of the agitating means for expanding the foliage of a plant, said agitating means and expanding means being vertically adjustable in unison.

6. A device of the character described comprising a driven shaft, a body supported thereby and provided with a trough adapted to underlie the foliage of a plant, a yoke pivotally engaged with the shaft, a shaft rotatably supported by the yoke and operatively engaged with the driven shaft, agitating means carried by the shaft, the side portion of the yoke adjacent the agitating means being inwardly inclined and adapted to pass through the foliage of a plant to separate or expand the same.

7. A device of the character described including a portable body, plant agitating means carried by the body, and means carried by the body rearwardly of the agitating means for expanding the foliage of a plant.

In testimony whereof I hereunto affix my signature in the presence of two witnesses.

GROVER C. TUCKER.

Witnesses:
JNO. G. APSEY, Jr.,
R. B. EVINS.

Copies of this patent may be obtained for five cents each, by addressing the "Commissioner of Patents, Washington, D. C."